United States Patent [19]

Strosser et al.

[11] Patent Number: 4,854,113
[45] Date of Patent: Aug. 8, 1989

[54] DIGITAL NOISE CANCELLATION IN A METAL DETECTOR

[75] Inventors: Richard P. Strosser, Akron; Carl E. Bohman, New Holland, both of Pa.

[73] Assignee: Ford New Holland, Inc., New Holland, Pa.

[21] Appl. No.: 138,985

[22] Filed: Dec. 29, 1987

[51] Int. Cl.$^4$ ............................................. A01D 75/18
[52] U.S. Cl. ...................... 56/10.2; 324/233; 340/572
[58] Field of Search ............ 56/10.2, DIG. 5; 340/614, 572; 324/244, 233, 225; 328/165-167

[56] References Cited

U.S. PATENT DOCUMENTS

| 3,896,608 | 7/1975 | Garrott | 56/10.2 |
|---|---|---|---|
| 3,959,953 | 6/1976 | Garrott | 56/10.2 |
| 3,972,156 | 8/1976 | Bennett | 56/10.2 |
| 4,168,496 | 9/1979 | Lichtblau | 340/572 |
| 4,531,118 | 7/1985 | Beams | 56/10.2 |
| 4,639,666 | 1/1987 | Strosser et al. | 56/10.2 |
| 4,677,384 | 6/1987 | Payne | 324/233 |
| 4,709,213 | 11/1987 | Podhrasky | 324/233 |

Primary Examiner—John Weiss
Attorney, Agent, or Firm—Griffin, Branigan & Butler

[57] ABSTRACT

A method and apparatus for cancelling cyclically recurring noise induced in a magnetic metal detector by movement of ferrous machine parts in the field of the detector provides for periodically sampling the output of the metal detector, delaying each sample for the duration of one cycle of the cyclically recurring noise, and subtracting the samples taken in one cycle from the output of the metal detector during the following cycle. The delay is accomplished by a delay line or shift register, or by storing the samples under microprocessor control. If the noise has a first component occuring at a first rate and a second component occuring at a second rate cancellation of both components may be accomplished.

16 Claims, 3 Drawing Sheets

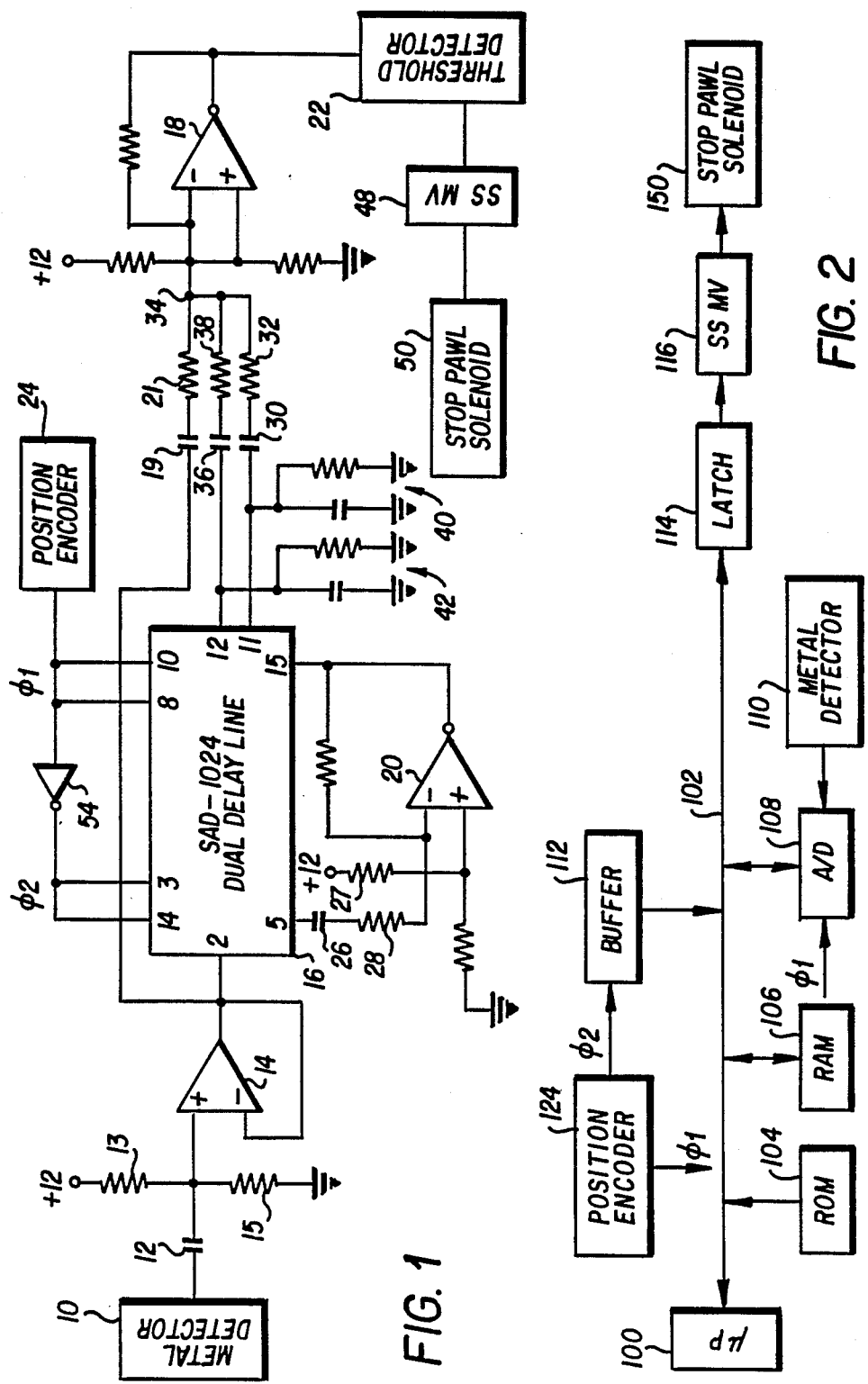

DIGITAL NOISE CANCELLATION IN A METAL DETECTOR

FIELD OF INVENTION

The present invention relates to a method of, and apparatus for, cancelling cyclically recurring noise induced in a metal detector by movement of ferrous machine parts in the field of the detector.

BACKGROUND OF THE INVENTION

U.S. Pat. No. 3,959,953 discloses a metal detector for detecting ferrous tramp metal passing with crop material through the feed of a forage harvester to a rotating cutter head. If a tramp metal object is detected in the crop material the metal detector produces an output signal to stop the feed to the cutter head before the cutter head is damaged. The metal detector is located inside a rotatable metal feed roll and in the vicinity of other rotating feed rolls, the cutter head, and other cyclically moving ferrous machine parts. These moving parts induce an output signal (noise) from the detector even though there is no tramp metal in the crop material passing through the feed. To reduce noise, magnetic shielding has been employed and machine parts have been made of magnetically transparent (i.e. stainless steel) material. Even these measures do not eliminate all noise. Therefore, to avoid the generation of a false signal which stops the feed, it has been conventional to provide a threshold detector to which the metal detector output signal is fed. The threshold detector is set so that it produces no output signal unless the sum of the noise component and the transient detection (i.e. resulting from sensing tramp metal) component of the output signal from the metal detector exceeds the threshold value.

The threshold detector method of noise cancellation is not entirely satisfactory when used alone. The noise component of the output signal from the metal detector is not constant but varies widely in magnitude. If the threshold of the threshold detector is set too high, so as not to give a false output signal when the noise is at a peak, then a detection signal occuring when the noise is at a minimum may not cause the threshold detector to produce an output signal even though it should. On the other hand, if the threshold is set too low, the noise alone, when it is at a peak, may cause the threshold detector to produce an output signal falsely indicating the presence of tramp metal.

The threshold detector method, when used alone, suffers a further disadvantage in that it is sensitive to gradual changes in noise (such as those resulting from wear of the moving parts) and thus may require adjustment from time to time.

The present invention overcomes the problems of the threshold detection method of noise cancellation by recognizing that most of the noise induced in the metal detector occurs cyclically or periodically and thus may be cancelled or filtered out by subtracting the noise occuring at a given point in one cycle from the noise occuring at a corresponding point in the previous cycle.

SUMMARY OF THE INVENTION

An object of the present invention is to provide a novel method and apparatus for cancelling or filtering from the output signal of a metal detector the cyclically occuring noise induced therein by ferrous machine parts moving within the sensing field of the detector.

An object of the invention is to provide a novel method and apparatus as defined in the preceding paragraph and which adapts to wide variations in the magnitude of the noise signal.

An object of the invention is to provide a novel method and apparatus for cancelling from the output signal of a metal detector the cyclically recurring noise induced in the metal detector by moving machine parts, said method and the operation of said apparatus being independent of the noise waveform.

The method according to this invention comprises the steps of periodically sampling the output signal from the metal detector, storing each sample for the duration of one cycle of the cyclically recurring noise, and subtracting the samples taken in one cycle from the output of the metal detector during the following cycle.

In one embodiment, an apparatus for practicing the method includes a delay line responsive to the analog output signal from a metal detector for delaying the analog output signal for one cycle of the cyclically recurring noise in the signal, and apparatus for subtracting the delayed signal from the output signal from the metal detector. The delay line may be a charge coupled device which periodically samples and stores the output signal from the metal detector at a rate determined by a position encoder driven by the machine in which the encoder and metal detector are located.

In a second embodiment the output of the metal detector is periodically sampled and digitized and a microprocessor stores the samples in a memory for at least the duration of one cycle of the cyclically recurring noise waveform. The microprocessor then subtracts the sample taken at one point in a given cycle from the sample taken at the corresponding point in the preceding cycle to thereby eliminate the noise.

In either embodiment, the signal resulting after noise cancellation is applied to a threshold detector whose threshold need only be set higher than the non-cyclic noise component. The output of the threshold detector is then used to control the stopping of the feed rolls.

Other objects of the invention and its mode of operation will become apparent upon consideration of the following description and the accompanying drawings.

BRIEF DESCRIPTION OF THE DRAWINGS

FIG. 1 is a block wiring diagram illustrating a first embodiment of the invention wherein storage is accomplished using a delay line;

FIG. 2 is a block diagram illustrating a second embodiment wherein storage is accomplished using a microprocessor and random access memory;

DETAILED DESCRIPTION OF THE INVENTION

Figure 5:
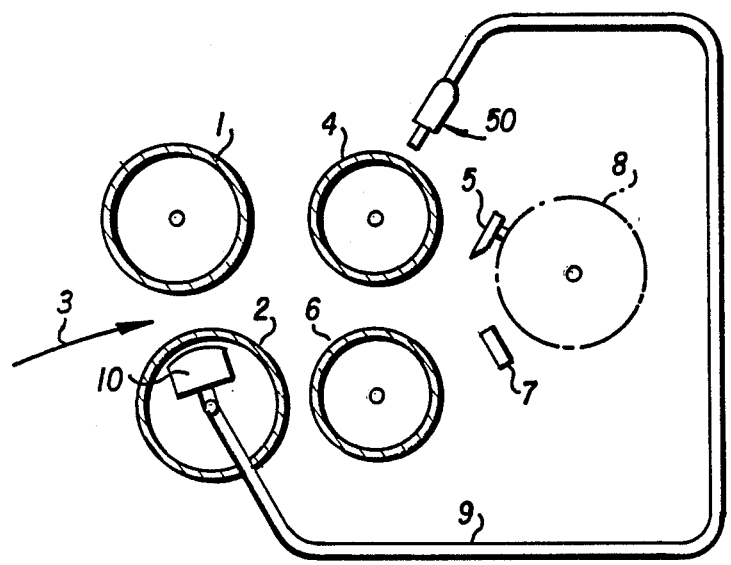

FIG. 5 schematically illustrates portions of a forage harvester of the type disclosed in U.S. Pat. No. 3,959,953. The harvester includes upper and lower front feed rolls 1 and 2, upper and lower rear feed rolls 4 and 6 and a cutter head 8 having a plurality of cutting knives 5 which cooperate with a cutter bar 7. The surfaces of the feed rolls are not smooth but are made up of a plurality of L-shaped elements as diagrammatically illustrated on a portion of feed roll 2.

Crop material is picked up from a field and fed into the front feed rolls by a mechanism (not shown) and generally follows the path indicated by arrow 3. The front feed rolls compact the crop material and feed it rearwardly to the rear feed rolls which then feed it to the cutter head where it is chopped between knives 5 and cutter bar 7. The chopped crop material is then discharged rearwardly.

The cutter head 8 could be severely damaged by a bolt, spike or other tramp metal picked up and fed into the cutter head assembly. To prevent this damage, a metal detector 10 is provided. The metal detector is supported in a fixed position inside the lower front feed roll 2. The output of the metal detector, if it exceeds some threshold value as a result of detection of tramp metal in the crop material, causes a signal to be applied over a lead 9 to a spring biased stop pawl and solenoid schematically illustrated at 50. As explained in the aforementioned patent, the solenoid is normally energized and holds the pawl out of engagement with a ratchet wheel forming part of the drive train for all of the moving parts illustrated in FIG. 5. When the metal detector 10 detects a piece of ferrous tramp metal a signal is sent over lead 9 to deenergize the solenoid. The spring then moves the pawl into engagement with the ratchet wheel to stop the drive train. A clutch is provided in the drive train to prevent damage to the drive train when the pawl engages the ratchet wheel.

The metal detector 10 shown in FIG. 5 produces an output signal even though it may not be detecting tramp metal in the crop material. This signal, termed "noise", is induced in the metal detector by the movement of ferrous metal parts of the harvester through the magnetic sensing field produced by the detector. The major component of this noise signal results from movement of the lower front feed roll 2 in the sensing field with lesser components resulting other ferrous moving parts, depending on the size of the parts and their distance and orientation relative to the detector 10.

The major component of the noise signal is cyclic in nature and repeats at a rate corresponding to the rate of rotation of the lower front feed roll 2. FIG. 1 illustrates an apparatus for filtering or cancelling from the metal detector output signal the component of the noise signal resulting from the lower front feed roll.

In FIG. 1, a metal detector circuit with adaptive noise filtering comprises a metal detector 10, having an output connected through a capacitor 12 to a buffer stage 14, a delay line device 16, two inverters 18 and 20, a threshold detector 22 and a position encoder 24.

A voltage divider comprising two resistors 13 and 15 sets the bias voltage for buffer 14. The output of buffer 14 is applied to input pin 2 of delay line device 16. In addition, the output of buffer 14 is connected by a lead 17, a capacitor 19 and a resistor 31 to a summing junction 34.

The delay line device 16 may be a bucket brigade device such as the type SAD-1024 Dual Delay Line device manufactured by Reticon Corporation. This device comprises two 512-stage clocked delay lines made up of charge coupled devices. The output of the first delay line appears at pin 5 and this output is connected through a capacitor 26 and a resistor 28 to one input of inverter 20. A voltage divider comprising two resistors 27 and 29 sets the bias voltage for inverter 20. The output of inverter 20 is connected to pin 15 which is the input of the second delay line. The output of the second delay line appears across pins 11 and 12. Pin 11 is connected through a capacitor 30 and resistor 32 to a summing junction 34 while pin 12 is connected through a capacitor 36 and a resistor 38 to the summing junction 34. Pins 11 and 12 are also connected to RC filter circuits 40 and 42, respectively.

The summing junction 34 is connected to one input of inverter 18. A voltage divider comprising resistors 44 and 46 sets the bias for inverter 18. The output of inverter 18 is connected to the threshold detector 22 which produces an output signal when the output of inverter 18 exceeds some predetermined level. The output signal from threshold detector 22 is applied to a single-shot multivibrator 48 which drives the stop pawl solenoid 50.

The position encoder 24 provides a train of clock pulses $\phi 1$ which are applied to the two delay lines in delay line device 16. The $\phi 1$ pulses are also passed through an inverter 54 and applied to the $\phi 2$ clocking inputs of the delay lines. The position encoder may be an optical, magnetic or other encoder but preferably is an optical encoder comprising a light source, reflective optical elements located on the end cap of the lower front feed roll 2, and a phototransistor for detecting pulses of light reflected from the reflective elements as the feed roll rotates.

The number of $\phi 1$ pulses produced by encoder 24 during one revolution of the lower front feed roll 2 is equal to the total number of stages in delay line device 16, i.e. 1024. However, it will be understood that for the general case where the delay line device 16 has N stages, the position encoder 24 should produce N $\phi 1$ output pulses for each revolution of the lower front feed roll.

Assuming the forage harvester is in motion and crop material is passing through the feed, the circuit of FIG. 1 operates as follows. The output signal from detector 10 is passed through buffer 14 and applied to delay line device 16. The delay line device takes an analog sample of the output of buffer 14 each time position encoder produces the pulse $\phi 1$. When $\phi 1$ goes false, the $\phi 2$ pulse gates the analog sample in each stage of the delay line device 16 to the next succeeding stage which accepts the signal upon occurrence of the next signal $\phi 1$ pulse.

The buffer output signal sampled by delay line device 16 at $\phi 1$ when the lower front feed roll 2 is at position 1 appears at output pin 5 at $\phi 1$ when the lower front feed roll is at position 512. The signal appearing at pin 5 is inverted by inverter 20 and at the next $\phi 1$ the inverted signal is clocked into stage 513 of the delay line device. When the lower front feed roll is at position 1024, the inverted signal appears at pin 11 at $\phi 1$ and at pin 12 at $\phi 2$. The inverted signal remains available until the next $\phi 1$ signal, i.e. the one occuring when the lower front feed roll is again at position 1. During this interval, the inverted signal is applied to summing junction 34. During this same interval, the output of metal detector 10, after passing through buffer 14, is applied to the summing junction. Assuming that tramp metal is not detected in the crop material, the two signals applied to summing junction 34 are made up of noise components only with the major noise components in each signal resulting from movement of the lower front feed roll in the sensing field of the metal detector. These major noise components are equal in value and opposite in polarity (because of inverter 20). These major noise components cancel each other so that the signal applied through inverter 18 to threshold detector 22 represents only the noise components which do not cyclically occur at the same rate as the rate of rotation of the lower front feed roll. The threshold detector has its threshold set to a value which is slightly above the magnitude of these non-cancelled noise components so that the multivibrator is not triggered.

Figure 4A:
FIG. 4 is a waveform plot showing the output of a metal detector with and without cyclic noise cancellation; and, FIG. 5 is a schematic representation of the feed rolls and cutter head of a prior art forage harvester.
Figure 4B:
Figure 4C:

FIGS. 4A-4C illustrate the improvement obtained with the present invention. FIG. 4A illustrates the wave shape produced by a metal detector when a tramp metal object is detected in the absence of noise. FIG. 4B illustrates the output waveform of a metal detector using a prior art filtering technique and FIG. 4C illustrates the signal appearing at junction 34 of FIG. 1. From a comparison of waveforms B and C it is evident that the threshold of the detector 22 may be set much lower than would otherwise be possible if the cyclic noise component resulting from the lower front feed roll were not cancelled. This means that smaller output signals from the metal detector 10 may be used to stop the harvester feed. Also, there is less likelihood of failing to recognize a signal resulting from detection of tramp metal when the signal occurs while the noise component is at a minimum.

In summary, the circuit of FIG. 1 takes 1024 samples of the output signal from the metal detector 10 during each revolution of the lower front feed roll. The samples taken during a given revolution R of the feed roll are subtracted from the output of the metal detector during revolution R+1 to cancel out cyclically occurring noise resulting from movement of metal ferrous machine parts (i.e. the lower front feed roll) in the vicinity of the metal detector. The difference signal represents tramp metal detected in the crop feed and any noise which does not occur cyclically at the same rate as the rate of rotation of the lower front feed roll. This signal is applied to the threshold detector 22. If the difference signal exceeds the threshold of the detector 22, the detector produces an output signal which triggers multivibrator 48 to thereby deenergize stop pawl solenoid 50 and stop the feed rolls.

It may be noted that the continuous analog output signal from metal detector 10 is applied to summing junction 34 while discrete analog samples from delay line device 16 are applied to the junction. However, this creates no problem because the output of the metal detector is a very slowly varying signal.

While the lower front feed roll 2 is the primary source of noise, other moving parts of the harvester induce noise in metal detector 10 to a lesser degree. This noise is also cyclic in nature but the cycles do not correspond to cycles of the lower front feed roll. Also, the cycle, in terms of the number of rotations of the lower front feed roll varies from one harvester model to the next. For example, in one model of forage harvester the induced noise signal was found to repeat fairly uniformly every 34th cycle of the lower front feed roll. FIG. 2 shows a microprocessor controlled system for adaptive filtering of any cyclic noise component induced by ferrous parts moving within the detection field of a metal detector even though those noise components do not repeat cyclically at the same rate as the rate of rotation of the lower front feed roll.

In FIG. 2, a microprocessor 100 is connected by a bus 102 to a ROM 104 which stores a program for controlling a RAM 106 and an A/D converter 108. A metal detector 110 is connected to A/D converter 108. A position encoder 124, which may take any of the forms described above, is mounted on the cap or end of the lower front feed roll and produces position signals indicating the rotational position of the feed roll. The encoder produces $\phi 2$ pulses which are applied to bus 102 through a buffer 112 and $\phi 1$ pulses which are applied to the A/D converter 108. A latch 114 is connected to bus 102 and when the latch is set its output signal acts through a single shot multivibrator 116 to deenergize a stop pawl solenoid 150, thereby stopping the feed rolls.

The circuit of FIG. 2 operates as follows. As the lower front feed roll rotates, the position encoder 124 alternately produces the signals $\phi 1$ and $\phi 2$. Each $\phi 1$ signal activates A/D converter 108 to sample the output signal from the metal detector 110 and convert it to a digital value. Each $\phi 2$ signal passes through buffer 112 and over data/address/control bus 102 to the microprocessor 100. The $\phi 2$ signal is applied to the external interrupt input of the microprocessor and causes the microprocessor to interrupt its program of operations and jump to a subroutine SENSE which is illustrated in FIG. 3.

The microprocessor 100 utilizes three addressable storage locations for storing counts representing the position count (PC), the revolutions count (RC) and a sample count (SC). When the microprocessor is turned on, PC, RC, and SC are set to 0 by an initialization routine (not shown). Three addressable locations store two mode flags named Mode 1 and Mode 2 and a First Pass flag. The mode flags are cleared during the initialization routine and the First Pass flag is set. When Mode 1 and Mode 2 are cleared, the system is in Mode 0. After the initialization routine is completed, the microprocessor goes to a main routine to control various functions not related to the present invention.

Figure 3:
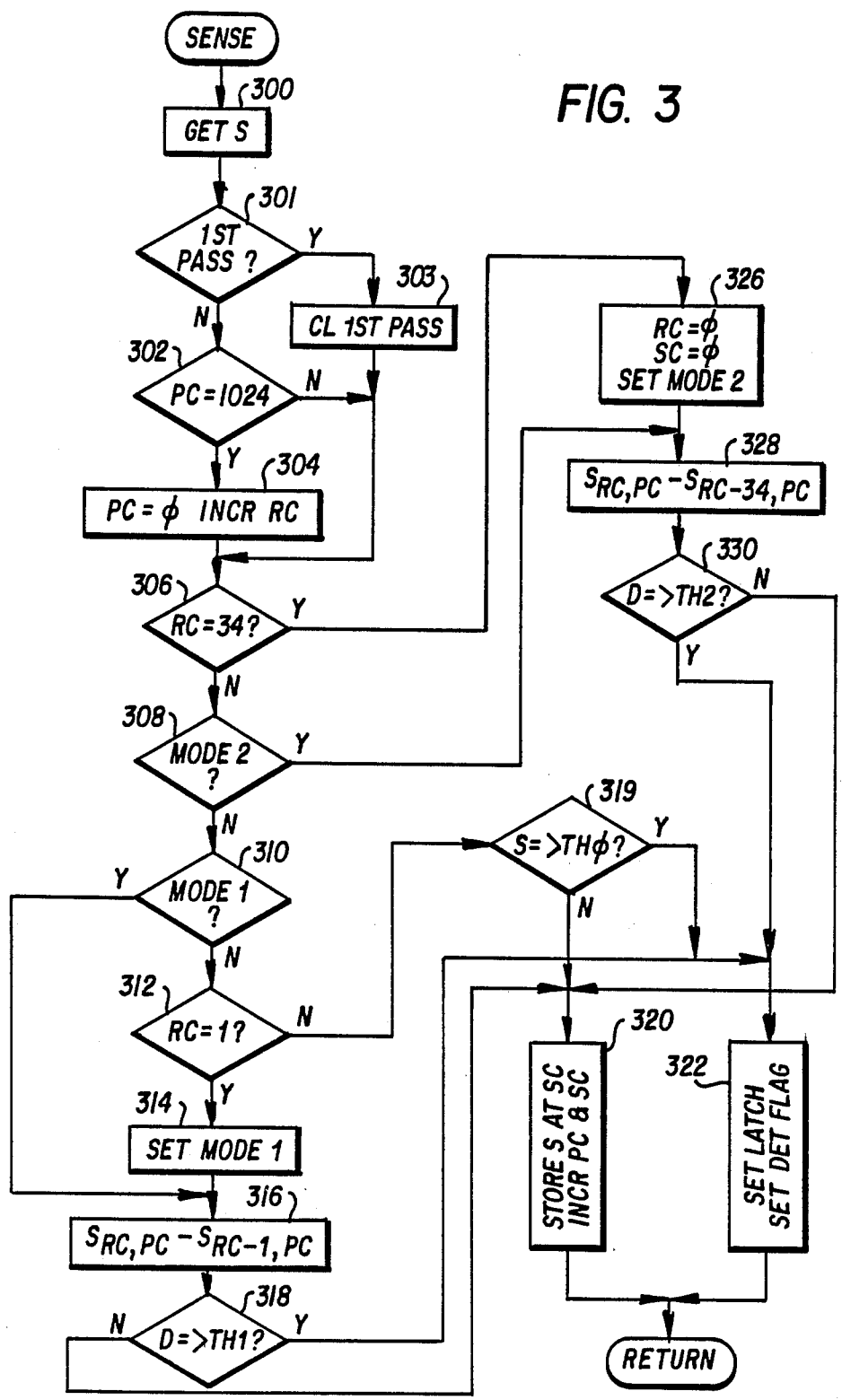
FIG. 3 is a flow diagram of one subroutine which the microprocessor may execute to eliminate a cyclically recurring noise component from the output signal of a metal detector.

Referring now to FIGS. 2 and 3, assume that the microprocessor has been turned on and the initialization routine completed. The main program is executed until the operator operates a control to initiate operation of the feed rolls and cutter head. When the lower front feed roll begins to turn, the When the lower front feed roll begins to turn, the position encoder begins to alternately generate the signals $\phi 1$ and $\phi 2$ in synchronism with the rotation of the lower front feed roll. Each $\phi 1$ signal activates A/D converter 108 which samples the analog output of metal detector 110 and converts the analog output to a digital sample value S. Each $\phi 2$ signal produced by encoder 124 passes through buffer 112 to interrupt the microprocessor 100. The microprocessor responds by jumping to the SENSE routine shown in FIG. 3.

At step 300, the microprocessor addresses A/D converter 108 to read therefrom the first sample (S). This sample is temporarily saved in a holding register and the routine moves to step 301 where the First Pass flag is tested. It was set during initialization so the routine branches to step 303 where it clears the First Pass flag before branching to step 306. At step 306 RC is tested to see if it contains the value 34. Since RC equals 0, the program moves to step 308 where the Mode 2 flag is tested. Since it is not set the Mode 1 flag is tested at step 310. The Mode 1 flag is also reset so the routine moves to step 312 where RC is tested to see if it contains the value 1. RC is still 0 so from step 312 the microprocessor moves to step 319 where it compares the sample with a threshold value TH$\phi$. Assuming that the sample value is less than the threshold value TH$\phi$ the program moves to step 320 where it stores S at the location SC=0 in a table in RAM 106 after which PC and SC are incremented. The microprocessor then returns to its main program.

At the second $\phi$1 signal the A/D converter takes another sample and converts it to a second digital value. The second $\phi$2 signal interrupts the microprocessor a second time it jumps again to the SENSE routine. At step 300 the second sample is stored temporarily in the holding register and the program moves to step 301. The First Pass flag is tested at step 301 and since it is now clear, the routine moves to step 302 where PC is tested to see if it contains the count 1024. Since PC equal 1, the program branches to step 306 and then execute steps 308, 310, 312, 319 and 320 before returning to the main program.

On the 3rd through 1024th interrupts the microprocessor executes the same steps as are executed for the second interrupt. Over this interval the lower front feed roll completes its first revolution. During the first revolution the SENSE routine stores 1024 digital samples in the table at addresses SC=0 to SC=1023. Each sample is compared with the fixed threshold value TH$\phi$ because there are no samples from a previous feed roll revolution with which the samples may be compared.

As the lower front feed roll begins its second revolution the position encoder generates the 1025th $\phi$1 signal to cause A/D converter 108 to sample the detector output, and the 1025th $\phi$2 signal to interrupt the microprocessor 100. The microprocessor jumps to the SENSE routine where step 300 addresses the A/D converter and saves the digital sample in the holding register. At step 301 the First Pass flag test proves false so the routine moves to step 302 where PC is tested to see if it contains a count of 1024. It does, so the routine moves to step 304 where PC is reset to 0 and the revolution count RC is incremented so that it now contains a count of 1.

From step 304 the routine performs the test at steps 306, 308, 310 and 312. The test at steps 306, 308, and 310 prove false but since RC is now equal to 1 the routine moves from step 312 to step 314 where it sets the Mode 1 flag. At step 316 the microprocessor subtracts from the latest sample which is presently in the temporary holding register, the sample stored at address PC=0. That is, the sample taken at position PC 0 of the first revolution is subtracted from the sample taken at the corresponding position of the second revolution. At step 318 the difference D resulting from step 316 is compared with a threshold value TH1. If D is less than TH1 the routine moves to step 320 to store the latest sample, from the temporary holding register, at SC. PC and SC are then incremented and a return is made to the main program.

After the next A/D conversion and the next interrupt, steps 300, 301, 302, 306, 308, and 310 are executed as described above. However, since the Mode 1 flag is set the routine branches from step 310 into step 316 to compare the latest sample with the sample taken at the previous corresponding PC count of the immediately preceding revolution. Each time PC reaches a count of 1024 the program moves from step 302 to step 304 to reset PC and increment RC. This mode of operation continues until RC reaches a count of 34. By this time the microprocessor has taken 1024×34 samples, stored them in memory at locations SC=0 to SC=34816 and holds the next sample in the temporary holding register. The first time the test at step 306 proves true, the program branches to step 326 where RC and SC are reset to 0 and the Mode 2 flag is set. At step 328, the first sample taken on the first revolution of the lower front feed roll, is subtracted from the sample taken exactly 34 revolutions later and now held in the holding register. At step 330 the difference is compared with a threshold value TH2 and if D is less than TH2 the program branches to step 320 to store the latest sample in the holding register at address SC (now 0 again). PC and SC are then incremented and a return is made to the main program.

Once the Mode 2 flag is set each execution of the SENSE routine causes the latest sample taken to be compared with the sample taken exactly 34 revolutions earlier.

RC maintains a count of 34 for only a short interval. That is, it is set to a count of 34 at step 304 and then two steps later it is reset to 0 at step 326. SC is also reset so that during the next 34 revolutions the samples taken replace the samples taken and stored in the RAM during the preceding 34 revolutions.

Once the Mode 2 flag is set the SENSE routine performs 300, 301, 302, 304 (only if PC=1024), 306, and 308. From step 308 the program branches to step 328 to execute steps 328, 330, and 320 if no tramp metal is detected.

In summary, the microprocessor first takes 1024 samples during the first rotation of the lower front roll and compares each of them with a first threshold value TH$\phi$. It then takes 33×1024 more samples with each of these samples being compared with the sample taken exactly one lower front feed roll revolution earlier. The difference between the two samples is then compared with a second threshold value TH1. Subsequently, on each cycle the samples taken are compared with the samples taken exactly 34 lower front feed roll revolutions earlier an the differences between the compared signals are then compared with a third threshold value TH2.

The foregoing explanation has assumed that no tramp metal is detected by the metal detector 110. If a piece of tramp metal is detected during the first revolution of the feed roll, the test at step 319 proves true and the program branches to step 322 where a signal is sent to latch 114 to set the latch. At the same time a detection flag is set. When the latch 114 is set it triggers single shot multivibrator 116 to momentarily deenergize stop pawl solenoid 150 thereby permitting the spring-loaded pawl to drop into the ratchet wheel and stop the feed rolls as previously described. The setting of the detection flag is recognized by the main program which resets the flags and counters in the same manner as is done for the initialization routine.

Experience has shown that this detection capability is necessary on the first revolution, particularly after maintenance, since parts or tools may be left in the inflow. The value of TH$\phi$ is chosen so as to detect substantial metal objects such as tools or parts.

If a piece of tramp metal is detected after the first revolution of the lower front feed roll but before the beginning of the 35th revolution of the lower front feed roll, the microprocessor recognizes the detection at step 318 and proceeds to step 322 to set latch 114 and stop the feed. From the foregoing description it is obvious that after the first revolution of the lower front feed roll and before the beginning of the 35th revolution the embodiment of FIG. 2 performs exactly the same function as the embodiment of FIG. 1. The subtraction which takes place at step 316 in effect cancels the noise which is cyclic at the same rate as the rate of rotation of the lower front feed roll. During this interval the noise which is not cyclic with respect to the rotation of the feed roll is not cancelled. Therefore, the value TH1 used at step 318 is chosen so that it is greater than this noise which is not cancelled.

On the other hand, once 34 revolutions of the feed roll have taken place, the subtraction at step 328 in effect cancels out the noise which is cyclic and recurs every 35th revolution of the lower feed roll. Therefore, the value TH2 used at step 330 may be lower than TH1 because more noise has been cancelled. The value of TH2 is chosen so that it is greater than any noise component which is not cyclic every 35th revolution of the feed roll.

From the foregoing description it is seen that the present invention provides a novel method and apparatus for effecting the cancellation of noise induced in a magnetic metal detector by various parts moving within the sensing field of the detector. The method is adaptive in that it is not affected by gradual changes in the noise. It can be applied to various models of harvesters even though their noise characteristics differ. Furthermore, the method and apparatus disclosed herein, while described in a forage harvester environment, are also applicable to other machines having either rotating and/or reciprocating parts.

While specific preferred embodiments have been described herein, it will be understood that various modifications and substitutions may be made in the described embodiments without departing from the spirit and scope of the invention as defined by the appended claims. For example, the embodiment of FIG. 1 may be modified by inserting a digital shift register in place of delay line 16. This requires an A/D converter in place of buffer 14 and a digital subtractor in place of summing junction 34 and inverter 18. Threshold detector 22 may in this case be a further digital subtractor.

The embodiments of the invention in which an exclusive property or privilege are claimed are defined as follows:

1. A method of filtering from the output signal of a metal detector the cyclically recurring noise signal induced therein by ferrous machine parts moving within the sensing field of the detector, said method comprising:
   obtaining sample signals by repeatedly sampling the output signal from the metal detector at intervals during one cycle of said cyclically recurring noise signal; and,
   subtracting said sample signals from the output signal of said metal detector during the next succeeding cycle of said cyclically recurring noise signal.

2. The method as claimed in claim 1 and further comprising the step of storing each of said samples for exactly the duration of one cycle of said cyclically recurring noise signal.

3. The method as claimed in claim 2 and further comprising the step of converting said output signal of said metal detector to a digital value before storing or subtracting said samples.

4. The method as claimed in claim 1 wherein the output signal of said metal detector is sampled at a rate controlled by the movement of one of said moving machine parts.

5. The method as claimed in claim 1 wherein the duration of one cycle of said cyclically recurring signal is equal to the time it takes for said one moving machine part to complete one cycle.

6. The method as claimed in claim 1 wherein the duration of one cycle of said cyclically recurring signal is equal to N times the time it takes for said one moving machine part to complete one cycle, N being an integer greater than 1.

7. Apparatus for filtering from the output signal of a metal detector the cyclically recurring noise signal induced therein by ferrous machine parts moving within the sensing field of the detector, said apparatus comprising:
   sample means for repeatedly sampling the output signal from said metal detector over at intervals during one cycle of said cyclically recurring noise signal; and,
   means responsive to said sample means and said metal detector for subtracting said sample signals from the output signal of said metal detector during the next succeeding cycle of said cyclically recurring noise signal and producing a difference signal.

8. Apparatus as claimed in claim 7 wherein said sample means includes a position encoder for producing position signals in synchronism with movement of one of said machine parts, and a delay means responsive to said metal detector and said position signals for storing samples of said metal detector output signal for an interval of time equal to the time it takes said one of said machine parts to complete one cycle of its movement.

9. Apparatus as claimed in claim 7 wherein said machine parts are in a harvester and said position encoder produces output signals in synchronism with rotation of a feed roll in said harvester, said apparatus further including a threshold detector, responsive to said means for subtracting, for producing a stop signal when the difference between said sample signals and the output signal of said metal detector exceeds a given threshold, and means responsive to said stop signal for stopping movement of said machine parts.

10. Apparatus as claimed in claim 9 wherein the threshold of said threshold detector is set to a value exceeding the level of non-cyclically recurring noise induced in said metal detector output signal.

11. Apparatus as claimed in claim 7 wherein said sample means includes a position encoder for producing position signals in synchronism with cyclic movement of one of said machine parts and an analog to digital converter responsive to said position encoder and said metal detector for converting the output signal from said metal detector to digital samples in response to said position signals, said apparatus further comprising:
   a microprocessor;
   memory means;
   a bus interconnecting said microprocessor, said memory means and said analog to digital converter, and,
   means responsive to said position signals for interrupting said microprocessor to execute a subroutine to transfer said digital samples to said memory means;
   said microprocessor including said means for subtracting whereby a difference signal is produced each time a signal from said position encoder interrupts said microprocessor.

12. Apparatus as claimed in claim 11 wherein said microprocessor includes means for comparing the difference signals produced during one cycle of said machine part with a first threshold value and producing a stop signal when said first threshold value is less than said difference signal.

13. Apparatus as claimed in claim 12 wherein said microprocessor includes means for comparing the difference signals produced during one cycle of said machine part with a second threshold value and producing said stop signal when said second threshold value is exceeded.

14. Apparatus as claimed in claim 11 wherein said subtracting means includes means for subtracting each digital sample produced by said analog to digital converter during one cycle of said one moving part from the digital samples produced during a preceding cycle of said one moving part.

15. Apparatus as claimed in claim 14 wherein said one cycle and said preceding cycle of said one moving part are consecutive cycles.

16. Apparatus as claimed in claim 14 wherein said one cycle and said preceding cycle of said one moving part are separated in time by the duration of at least one further cycle of said one moving part.

* * * * *